(12) United States Patent
Hull, Jr.

(10) Patent No.: US 7,400,476 B1
(45) Date of Patent: Jul. 15, 2008

(54) SAFETY DEVICE FOR PREVENTION OF ELECTRICAL SHOCKS

(76) Inventor: Vernon M. Hull, Jr., 29370 Loper Rd., Loxley, AL (US) 36551

( * ) Notice: Subject to any disclaimer, the term of this patent is extended or adjusted under 35 U.S.C. 154(b) by 447 days.

(21) Appl. No.: 11/009,113

(22) Filed: Dec. 10, 2004

Related U.S. Application Data

(60) Provisional application No. 60/528,067, filed on Dec. 10, 2003.

(51) Int. Cl.
 *H02H 3/00* (2006.01)
(52) U.S. Cl. ......................................... 361/42
(58) Field of Classification Search ................ 361/42
 See application file for complete search history.

(56) References Cited

U.S. PATENT DOCUMENTS

| | | | |
|---|---|---|---|
| 3,697,808 A | 10/1972 | Lee | |
| 3,761,774 A | 9/1973 | Laughinghouse et al. | |
| 3,809,961 A | 5/1974 | Kershaw | |
| 3,996,496 A | 12/1976 | Volk, Jr. | |
| 4,598,331 A | 7/1986 | Legatti | |
| 4,649,454 A | 3/1987 | Winterton | |
| 4,821,027 A * | 4/1989 | Mallory et al. | 340/521 |
| 4,931,893 A | 6/1990 | Glennon et al. | |
| 5,469,063 A * | 11/1995 | Winter | 324/508 |
| 5,541,800 A | 7/1996 | Misencik | |
| 5,638,243 A | 6/1997 | Torezan et al. | |
| 5,650,771 A | 7/1997 | Lee | |
| 5,828,309 A | 10/1998 | Kumakura et al. | |
| 5,844,795 A | 12/1998 | Johnston et al. | |
| 5,943,198 A | 8/1999 | Hirsh et al. | |
| 5,973,896 A | 10/1999 | Hirsh et al. | |
| 6,049,143 A | 4/2000 | Simpson et al. | |
| 6,052,265 A | 4/2000 | Zaretsky et al. | |
| 6,094,329 A | 7/2000 | Heinz et al. | |
| 6,243,626 B1 | 6/2001 | Schanin | |
| 6,522,510 B1 | 2/2003 | Finlay et al. | |
| 6,525,914 B1 | 2/2003 | Legatti | |
| 6,560,079 B1 | 5/2003 | Hirsh et al. | |
| 6,611,406 B2 | 8/2003 | Neiger et al. | |
| 6,813,126 B2 | 11/2004 | DiSalvo et al. | |

* cited by examiner

*Primary Examiner*—Ronald W. Leja
(74) *Attorney, Agent, or Firm*—King & Spalding

(57) ABSTRACT

A safety device can provide electrical shock protection for an electrical appliance. Voltage sensors can monitor voltage levels among a power conductor, a neutral conductor, and a ground conductor. When sensed voltages indicate that these conductors are properly wired to an electrical power utility, inline switches can close to allow power to pass through the safety device to the appliance. When one or more of the sensed voltages indicates that the power level is too low to operate the appliance, one or more switches of the safety device can open to block power from passing through to the appliance. When one or more of the sensed voltages indicates that an electrical problem posing a shock hazard exists in the electrical appliance, one or more switches of the safety device can open to interrupt power from transmitting to the appliance.

26 Claims, 2 Drawing Sheets

Legend

| | |
|---|---|
| T-1, T-2, | Control transformer 120/12 VAC |
| CR-1, CR-2, | Bridge rectifiers |
| K-1, K-2 | DPDT relay, 12 VDC |
| K-4 | DPST relay, 12 VDC |
| ⓤⱽ | Low Voltage Detector |

SAFETY DEVICE FOR PREVENTION OF ELECTRICAL SHOCKS

CROSS REFERENCE TO RELATED APPLICATIONS

This application claims the benefit of priority to U.S. Provisional Patent Application No. 60/528,067, entitled "Safety Device to Protect Against Shock from Improper Electrical Connections in Electrical Outlets," and filed Dec. 10, 2003. The subject matter of U.S. Provisional Patent Application No. 60/528,067 is hereby incorporated by reference.

FIELD OF THE INVENTION

The present invention relates to the field of electrical devices, and more specifically to safety devices that prevent electrical shock from improperly wired electrical outlets.

BACKGROUND

An electrical appliance or load receives electrical energy from one terminal of an electrical outlet or source (the so-called high voltage or hot side), electrical current flows to the load through an electrical conductor (a wire), this current passes through the load and is then returned to another terminal of the electrical outlet through another wire called the neutral wire. The two wires that connect source and load may have a coating of rubber or some other electrical insulating material or they may be bare, in which case air, which is a good insulator, functions to inhibit electrical current flow outside of the wire. Since the human body can conduct the flow of electrical current, if a person comes into contact with one electrified object, such as the so-called hot wire in an electrical system, while also making contact with a second object having a substantially different voltage, then an electrical leakage current that is proportional to the voltage difference will flow through the person and may cause injury or death. If the second object that the person comes in contact with is electrically connected to the earth ("ground") then this is called a ground fault.

Electrical current is the flow of electrons. Electrons are neither created nor destroyed so any functioning electrical appliance will require both an entry path for electrons and an exit path for electrons in order for electrical current to flow. For most household appliances that operate from a plug, electrons will sometimes enter path one and exit path two and sometimes enter path two and exit path one. This is known as alternating current or AC operation.

Although the two conductors coming out of an AC power source are often designated as "hot" and "neutral", in an AC system, the hot conductor will cyclically have a more positive voltage than the neutral for half the time and will cyclically have a more negative voltage than neutral for half the time, having a momentary value of zero (the so-called "zero crossing") each time the voltage passes from positive to negative or from negative to positive.

Any electrical appliance that plugs into a wall outlet can be the source of electrical shock, electrical burns, and possibly electrocution. Worn or damaged appliances or appliance cords may come in contact with a conducting surface that is accessible to the user, thus presenting a hazardous condition. For example, if the rubber insulation on a wire within an appliance is worn, then the exposed metal wire strands might touch the appliance housing. If the appliance housing were made out of metal or a similar electrical conducting material then a shock hazard could exist.

In order to minimize the potential hazards intrinsic to electrical appliances, government and industry standards serve to regulate the way in which appliances are built and used. One outcome is that many classes of electrical appliances are required to have a grounded connection over and above the standard two electrically conductive wires that supply electrical power to the appliance. A grounded electrical cord is recognizable because it has a plug with three prongs. In the U.S., in a 120 volt (sometime referred to nominally as 110 volts, 115 volts, or 120 volts) single phase system, two of the prongs on a grounded plug are flat and the third, ground prong, is generally rounded.

To achieve electrical protection, the grounding line will connect to ground at the plug where it is plugged into a grounded outlet. The other end of the grounding line, within the cordset, will connect to the appliance housing or other exposed or potentially exposable metal parts. If an electrically hot (that is, having a voltage potential that is significantly different from a ground potential) conductor comes into contact with a grounded conductor, the grounded conductor will present a low resistance path to ground, causing the hot conductor to maintain a voltage at or near a ground potential. If the current drawn from an electrically hot source, through ground, exceeds the "trip" current of an in-line circuit breaker, the circuit breaker will open, removing power from the outlet that the appliance is plugged into, thereby protecting the electrical distribution system from over-current damage and protecting the user from electrical shocks.

If the ground connection on a grounded appliance is removed, the safety of the appliance is compromised. This removal of ground condition can occur through abuse or damage but more commonly occurs when the appliance is plugged into an outlet in which the ground has not been connected or is improperly wired. The removal of ground may also occur if the grounding prong is cut off of the plug or is otherwise disconnected. An open ground condition often goes unnoticed by the casual user. This is because most appliances will operate normally without a ground connection.

In the U.S., agencies such as the National Fire Protection Association (NFPA) and the Occupational Safety and Health Association (OSHA) maintain regulations governing the use of grounded appliances. For many situations, the regulations require that a qualified technician periodically test the continuity of the ground connection between appliance and the grounding prong and between grounding prong and actual ground.

One drawback to the periodic test approach is that a significant period of time may elapse between inspections. In many situations the inspection schedule may not be adhered to or may be completely ignored. Also, malfunctions, particularly if intermittent, may go undetected. Often a complete inspection of the grounding impedance between actual ground is not made. Accordingly, there are many situations where a user may assume he is using a grounded appliance when he is not.

Another potentially hazardous operating condition occurs when the hot and the neutral conductors are switched at an outlet. The typical appliance that is plugged into an outlet with these so-called "transposed" conductors will still operate. However, the design of many appliances is such as to favor having one of the two power carrying conductors designated as the neutral conductor. For example, in a droplight, the socket for an incandescent light bulb will have the outlet shell as neutral with the base connected to the hot conductor. Then if a user accidentally makes contact with the exposed outer shell, electrical shock is less likely to result. The neutral and hot conductors are distinguished by using a polarized plug wherein one of the two blades is designated as neutral and is physically wider. If a droplight is plugged into a polarized outlet but the hot and neutral conductors in that outlet are transposed, the safety associated with using a polarized plug has been compromised. In such situations, it is important to alert the user.

In the prior art, U.S. Pat. No. 3,697,808 (Lee) discloses a system for monitoring chassis potential and ground continuity by injecting a radio frequency (RF) signal into the neutral lead and monitoring the signal amount that is capacitively coupled to ground. A major limitation of this approach is that it is electronically complicated and is sensitive to leakages through capacitances in the power cable and elsewhere.

U.S. Pat. No. 3,809,961 (Kershaw) discloses an electrical outlet sentinel that detects an open ground condition in an electrical outlet and opens a mechanical circuit breaker thereby removing power from the outlet. A major objection to this design is that power from the outlet is controlled by a circuit breaker whose relay is energized through power running continuously through ground. For any practical relay, this represents a substantial continuous ground current and is likely to disrupt the correct operation of any ground fault circuit interrupters that are upstream in the electrical distribution system.

U.S. Pat. No. 3,996,496 (Volk) discloses a ground integrity monitor that relies on the application of short electrical pulses between the neutral and ground terminals. If the resistance between neutral and ground is less than a threshold amount, this pulsing purportedly causes a photo coupler to be activated, providing power to the load. The system is electronically complicated and this compromises the appeal of the design.

U.S. Pat. No. 4,598,331 (Legatti) discloses a ground fault interrupt circuit in which open ground conditions create actuation of the interrupter. An open ground produces current flow through a supplemental secondary winding that, in turn, induces a trip signal. When implemented, this approach does not check for a good connection going forward to the appliance, but only going back to the outlet. If, for example, the grounding conductor on the appliance cordset is cut, thereby leaving the appliance ungrounded, this approach will not detect that condition.

U.S. Pat. No. 4,649,454 (Winterton, et al.) discloses an open ground detection circuit for appliances that utilizes a special plug with four electrical connections. Two of these are the standard hot and neutral prongs. A third prong, having the location and shape of a conventional ground prong, has two electrical conductors (the so-called grounding blade and sensing blade) that are separated by an insulating member. Four wires connect this special plug to a housing that is located within an appliance. When the special plug is correctly seated in a three-hole grounded outlet, the two blades on the third prong are electrically connected together. If, however, the two conductors on the third prong are not electrically connected together, then an alarm signals that an open ground condition exists. A major problem with this design is that it only checks to see whether grounding blade and sensing blade are shorted together. This can occur even if the plug is connected to an ungrounded outlet and the user would incorrectly assume that the appliance was grounded. Another problem with this design is that it requires a special plug and four wires to connect between the appliance and this special plug.

U.S. Pat. No. 4,931,893 (Glennon) discloses a circuit that detects a loss of ground condition in an electrical system by using a capacitive circuit that discharges through the ground. The disclosed embodiments are electronically complex and can generate relatively high ground currents which would cause nuisance tripping in distribution systems having ground fault interrupters.

U.S. Pat. Nos. 5,844,795 and 5,943,198 and U.S. patent application Ser. No. 08/756,784, all to Hirsch et al., describe a solid state ground and arc fault detection and interruption technology that has two parts, one part which resides in the load and one part which resides in the source. In applying this to an electrical appliance, the load is the appliance and the source is the plug. The basic theory in this technology is that a load conditioning module in the appliance injects a deadzone in the current flow during each half wave AC cycle. A sensing circuit in the plug looks for the presence of that deadzone each half cycle. If there is leakage around the load conditioning module (indicating a ground fault or arcing fault) this is indicative of a potential dangerous condition and current flow is interrupted at the plug.

To address these representative deficiencies in the art, what is needed is an improved capability for controlling electrical power to an appliance in a manner that provides safety to people that may come in contact with the appliance.

SUMMARY OF THE INVENTION

The present invention supports controlling electrical power on a supply line to an electrical appliance, such as a vending machine, tool, machine, equipment, motor, or other device or load that consumes electrical energy, to protect against electrically shocking people that may contact the appliance.

In one aspect of the present invention, a safety device that helps prevent electrical shock can comprise voltage sensing circuits that monitor voltage levels among or between a power conductor, a neutral conductor, and a ground conductor. When one or more of the sensed voltages indicates that these conductors are properly wired to an electrical power utility, inline switches can close to allow power to pass through the safety device to the appliance. When one or more of the sensed voltages indicates that the power level is too low to support properly operating the appliance, one or more switches of the safety device can open to block power from passing through to the appliance. When one or more of the sensed voltages indicates that an electrical condition in the electrical appliance poses a shock hazard or threat, one or more switches of the safety device can open to interrupt power from transmitting to the appliance.

In another aspect of the present invention, the safety device can provide shock protection for vending machines that operate in public places. Upon occurrence of an event that poses a safety threat or issue, the safety device can isolate the vending machine from the electrical utility while keeping the connection to earth ground intact. Electrically isolating the vending machine can comprise opening the neutral conductor and the power conductor, which may also be referred to as a hot conductor or lead.

The discussion of providing protection against electrical shock presented in this summary is for illustrative purposes only. Various aspects of the present invention may be more clearly understood and appreciated from a review of the following detailed description of the disclosed embodiments and by reference to the drawings and claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of exemplary embodiments of the present invention. Moreover, in the drawings, reference numerals designate corresponding parts throughout the several views.

DETAILED DESCRIPTION OF EXEMPLARY EMBODIMENTS

The present invention supports providing electrical safety protection for an appliance by monitoring voltage levels on conductors that feed electrical power to the appliance and actuating switches when the voltage levels indicate the presence of an electrical safety issue.

This invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and among others supported by exemplary embodiments of the present invention.

The present invention can comprise a process or method related to providing electrical safety protection. Certain steps in any exemplary processes or methods described herein must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 1:
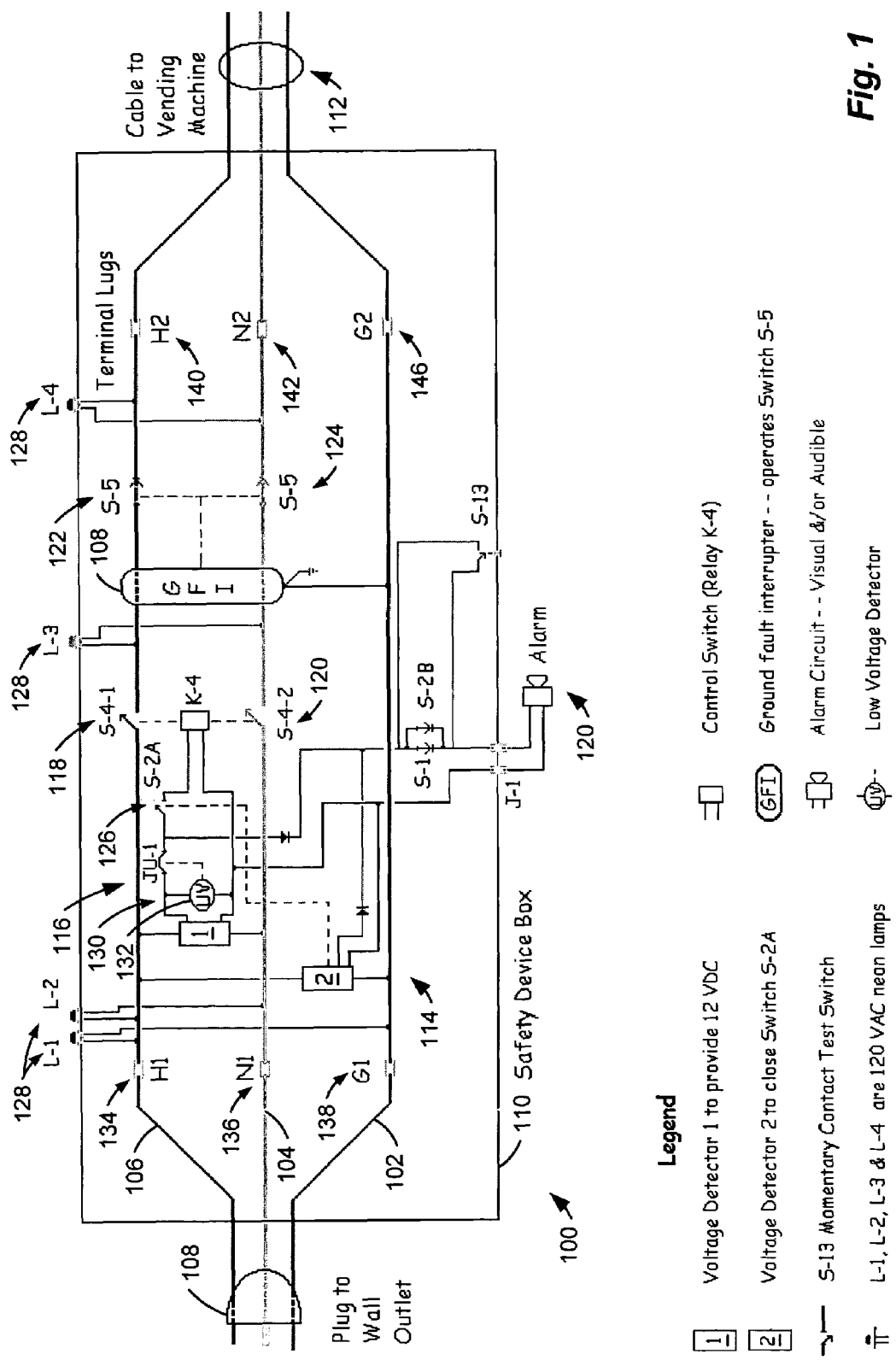
FIG. 1 is an electrical schematic of an exemplary electrical safety device that provides protection against electrical shocks in accordance with an exemplary embodiment of the present invention.
Figure 2B:
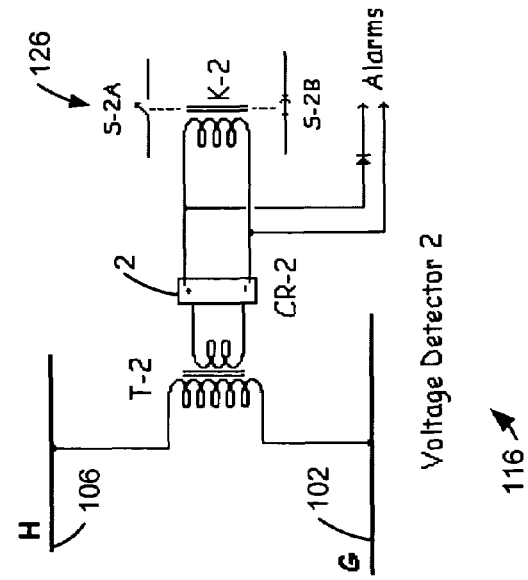
FIGS. 2A and 2B are electrical schematics of exemplary circuits for an electrical safety device in accordance with an exemplary embodiment of the present invention.
Figure 2A:
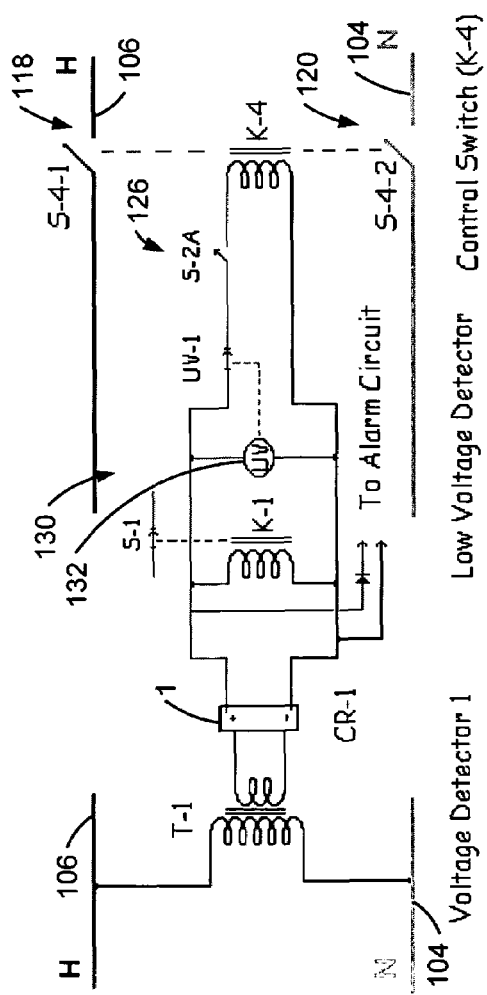

Turning now to FIGS. 1 and 2, circuitry for an exemplary electrical safety device in accordance with an embodiment of the present invention will be described with reference to these figures. FIG. 1 illustrates a schematic of an exemplary safety device 100 that withholds electric power from an appliance, such as a tool or electrical machine, if the electric outlet 108 that it is plugged into is improperly wired. FIGS. 2A and 2B illustrate schematics for exemplary circuits of the safety device 100.

The safety device 100 plugs into an electric outlet, typically wall mounted, and an appliance connects to the safety device 100. In one exemplary embodiment of the present invention, the safety device 100 provides power protection to a vending machine (not illustrated). The safety device 100 can be mounted on or in such a vending machine. That is, the vending machine and the safety device 100 can share a common housing. Alternatively, the safety device 100 can be external to a vending machine.

The basic safety device 100 can be self-contained and designed to plug into an electric outlet with the appliance receiving its electrical power through the safety device 100. The safety device 100 can be hard-wired to the appliance or to a receptacle that mates with a power cable. The safety device 100 can provide an essentially equivalent level of protection against shock independent of its mounting configuration.

If the safety device 100 is configured in a plug-in format, the safety protection can be bypassed by simply unplugging the appliance from the safety device 100 and plugging the appliance directly into the electric outlet. Thus, when used on large electrical appliances, the safety device 100 is preferably hard-wired in the electric cable between the electric outlet and the operating mechanism of the machine. For example, the device can be mounted inside the machine so that users can not be tamper with it. A flashing light and remote audio alarm 120 can provide an indication of the state of the safety device 100. That is, an indicator can provide a visible or audible signal that indicates whether power is properly or improperly wired to the appliance.

In a nonpermanent installation, the safety device 100 can also be used as the outlet box on an extension cord. That is, the safety device 100 can comprise an outlet that mates with a power cord of a tool or other appliance. For example, handheld power tools can plug into the safety device 100, thereby protecting users from shock. Again, if the electric outlet that the safety box plugs into has been improperly wired, the tools will not receive any power. That is, the safety device 110 prevents electrical power from transferring to the tool if the electrical wiring that feeds the tool is miswired.

The safety device can comprise two or more indicator lights 128. One of the indicator lights 128 can emit red light as an indication that the power feed lines 102, 104, 106 to the appliance are properly wired. Another indicator light 128 can emit green light to indicate that the appliance is properly wired or improperly configured.

If the voltages on the electric receptacle are the proper values when the appliance is plugged in, the safety device 100 will allow power to transmit to the appliance. If the voltages are incorrect, the safety device 100 blocks power from transmitting to the appliance. A user or operator of an appliance connected to the safety device 100 will notice the power interruption as a motivation to troubleshoot the problem and correct the wiring error. That is, the electrical wiring problem will need to be corrected before a person or member of the public can operate the appliance.

In addition to providing protection for connecting power to an appliance, the safety device 100 continuously monitors the voltages on the power feed lines 102, 104, 106. That is, the safety device 100 provides power protection after the appliance tool begins operating. If any of the measured voltages become incorrect, the safety device 100 will remove power from the appliance. Thus, in one exemplary embodiment, the safety device 100 is not limited to checking power when the appliance is initially plugged in to an outlet. The safety device's continuous monitoring capabilities can protect against a wiring change of the outlet that occurs subsequent to initially connecting electrical service to the appliance. Thus, the safety device 100 can provide on-line, continuous monitoring of the electrical service to an appliance. This feature is useful for vending machines that operate in public places, for example.

In one exemplary embodiment, the safety device 100 comprises a differential current detector. If the hot lead 106, which may also be referred to as the power conductor 106, into the appliance comes into electrical contact with the metal frame of the appliance, a separate safety switch opens up, removing the power. The voltage remains off until the differential switch is reset. This feature is also continuously monitoring the circuit.

These features reduce the chance that a person will be shocked or injured by electricity on an appliance equipped with the safety device 100.

As discussed above, in one exemplary embodiment of the present invention, the safety device 100 provides electrical safety protection for a vending machine, such as a soft drink vending machine that dispenses cold drinks in aluminum cans. Operation of the safety device 100 in an exemplary vending machine application will now be discussed in further detail below. Those skilled in the art should be able to apply electrical safety protection in accordance with the present invention to a wide variety of tools, equipment, appliances, and machinery applications following this discussion, the drawings, and the remaining disclosure. For example, the safety device 100 can provide electrical protection to a domestic refrigerator or freezer.

Referring to FIG. 1, the safety device 100 connects to a wall outlet or power socket (not shown) via a polarized plug 108. The plug 108 can have three prongs, one for the power line 106, one for the neutral line 104, and one for the ground line 102. These three lines or power conductors 102, 104, 106 supply electrical power to the vending machine (not shown). The electrical power, which is typically 120 volts, single phase alternating current, passes through the safety device 100 on its path to the vending machine.

The safety device 100 blocks, interrupts, or does not allow power to pass through to the vending machine if the electric outlet is miswired. Further, the safety device can isolate the vending machine from the electrical utility while maintaining a connection to earth ground. The vending machine simply will not turn on or operate if the electric supply source is not properly wired.

The safety device 100 comprises three voltage detection circuits 116, 114, 130 one current differential circuit 108, and one alarm circuit 120. The three voltage detection circuits 114, 116, 130 monitor, detect, or look for levels of voltage difference among the power or hot conductor 106, the neutral conductor 104, and the ground conductor 102. Each of these detection circuits 114, 116, 130 can monitor the respective voltage levels as compared to a threshold voltage, which can be a minimal, trickle, or essentially zero voltage.

The first voltage detection circuit 116 monitors the voltage difference between the power conductor 106 and the neutral conductor 104. The second voltage detection circuit 114 monitors the voltage difference between the power conductor and the ground conductor 102. The ground conductor 102 typically comprises an equipment ground and is electrically connected to or comprises the frame of the vending machine. The third voltage detection circuit 130 comprises a low voltage detector 132 that monitors the magnitude of the voltage on power and neutral conductors 106, 104.

If the proper voltages are present on the electrical service lines 102, 104, 106 when the vending machine is first plugged into the outlet, the control switches 118, 120 close and power is allowed to pass through to the current differential circuit 108 and on to the operating mechanisms of the vending machine. In response to this power, the vending machine's lights will come on and its cooling compressor will start cooling.

If an improper voltage appears at any of the detection circuits 114, 116, 130 when the vending machine is first plugged in to the outlet, the control switches 118, 120 remain open and the safety device blocks voltage from passing through to the vending machine. Thus, if the wiring configuration is backwards or otherwise wrong, the vending machine does not receive power and does not comes on. Having a vending machine that is in a state of non-operation typically motivates a technician or other service personnel to inspect the electric outlet and address the problem.

Once the vending machine is plugged in and is operating properly, the safety circuit continuously monitors the supply voltages. If any supply voltage changes, the control switches 122, 128 open, thus removing electrical power from the vending machine.

If the hot line 106 in the electric outlet becomes switched to the safety ground contact, then one of the voltage detectors 1, 2 will trigger an alarm circuit 120. A strobe light mounted on the exterior of the vending machine will start flashing. In addition, a wailing audible alarm will sound off. This notifies people not to touch the vending machine.

In one exemplary embodiment of the present invention, the safety device 100 outputs an audible warning message, for example "Do not touch this vending machine," via a digital recording coupled to a speech synthesis chip or similar device.

While a flashing red light may provide an adequate warning of a safety hazard to an adult, young children may not understand the significance of the light. A young child might even be drawn to a siren or flashing light. However, even a young child can understand a warning sentence, phrase, or word delivered in a verbal or spoken format. Such digitally synthesized speech can have a harsh tone or other inflection that children can recognize and appreciate.

In addition, the current differential detector 108 continuously monitors the current of both the power conductor 106 and the neutral conductor 104, once the vending machine is functional. When the power current equals to, or is within a threshold of, the neutral current, the vending machine operates in a normal manner. However, if the current through the one of these conductors 104, 106 becomes a certain amount more than the current on other conductor 104, 106, the current differential monitor 108 opens up the power conductor 106 to the vending machine. The line remains open until the differential detector 108 is reset.

A properly wired electric outlet that provides 120 volt (nominal) single phase alternating current (AC) will typically provide approximately 125 volts AC between the power conductor 106 and the neutral conductor 104. The voltage detector 1 of the circuit 116 will detect this voltage and close the switches 118 and 120 (switches S-1) upon determining that the voltage indicates a proper wiring configuration. In a properly wired electric outlet, there will also be approximately 125 volts AC between the power conductor 106 and the ground conductor 102. The voltage detector 2 of the circuit 114 will detect this voltage and will close the switch S-2 126.

The closure of the switch 116, the switch 120, and the switch S-2 126 puts a voltage on relay K-4 116, which energizes and closes both switches S-4-1 118 and S-4-2 118. This action allows power to pass through the safety device 100 to the vending machine and its internal circuits. In operation, voltage detector 1 supplies 12 VDC to operate relay K-4 and voltage detector 2 closes switch 126, thereby energizing relay K-4 to pull in the switch 118 and the switch 120. That is, the twelve volts from voltage detector 1 and switch 126 must be in the "on" or closed state at the same time to allow electrical power to pass to the vending machine.

Thus, the safety device 100 prevents operation of the vending machine if the equipment ground wire is open or otherwise provides an inadequate level of grounding. In many circumstances, an improperly grounded vending machine (not shown) might continue to operate in a dangerous state. Since many vending machines installations predate government regulations that mandate electrical grounding, the safety device 100 can help prevent electrical injury associated with these older machines.

The equipment ground conductor 102 is connected directly to the metal frame of the vending machine. Its purpose is to keep the frame of the machine at "earth ground" potential to prevent electrical shock. It does this by tying the frame all the way back to a ground buss on the main breaker panel with a conductive path that may be referred to as one "continuous wire."

Thus, if the power conductor 106 accidentally comes into electrical contact with the metal frame inside of the vending machine, the ground circuit provides an electrical path back to the electrical system ground. This ground fault current should trigger the circuit breaker to trip, if and when that current reaches the breaker rating. Such arrangement is specified by the National Electric Code (NEC).

The NEC specification are generally viewed as providing an adequate level of protection for the electrical conditions that may damage electrical wires. However, an added level of protection, as provided by the safety device 100, can help prevent electrical shock to people that may inadvertently come in electrical contact with a vending machine having improper wiring or a fault or other potentially hazardous condition.

The safety device 100 can immediately detect an open equipment ground, issue a warning, and interrupt electrical service to a vending machine. When the equipment ground opens, the voltage detection circuit 114 does not close the switch S-2 114. When the switch S-2 114 opens, relay K-4 116 drops out and power is removed from the vending machine. Power remains disconnected until the electric outlet is rewired correctly.

Detection circuit 114 and detection circuit 116 provide a level of protection against shock that covers the majority of the wiring problems that are associated with electrical outlets. However, in one exemplary embodiment, the safety device 100 comprises two additional circuits 130 108 that provide an additional level of protection against shock hazards.

The low voltage detector 132 and its associated circuit 130 provide low-voltage protection. That is, the low voltage circuit 130 interrupts power to the vending machine if the voltage drops to an unacceptably low level. Under such a low voltage condition, electric motors can draw excessive current, heat up, and burn out. The voltage detector 132 opens the switches 118, 120 of the control circuit, relay K-4 116, when the hot-to-neutral voltage falls below a predetermined value or threshold. The voltage detector circuit 116 can be an optional feature of the safety device 100 for protecting electric equipment with motors and/or compressors that are sensitive to low-voltage damage.

The second extra protective device is the differential current monitor 108, which can be a built-in ground fault detector. If an un-insulated section of the power conductor 106 accidentally touches the metal frame of the machine, some current will flow through the equipment ground back to the ground buss. In this situation, the power conductor 106 will carry essentially all of the incoming current and the return current will be divided between the neutral conductor 104 and the ground conductor 102. The differential current detector 108, which can be referred to as a ground fault indicator (GFI), senses this difference in current and trips, thereby opening up the hot lead 106 and the neutral lead 104 to the vending machine. In comparison to opening only the hot lead 106, opening both the hot lead 106 and the neutral lead 104 offers an added level of safety protection. Thus, the safety device 100 can electrically isolate a vending machine from the electrical utility, while keeping the earth ground intact, when a ground fault occurs. In the ground fault situation, switch 122 and switch 124 remain open until reset and the ground fault is cleared. If the problem is not corrected, the differential current detector 108 will trip again as soon as it is reset. That is, the ground fault switches 122, 125 will continue tripping until the leakage path to ground is removed.

As will be appreciated by those skilled in the art, the level of safety protection that an individual GFI circuit provides can be inadequate in certain circumstances. However, including the GFI circuit in the safety device 100 can provide an enhanced level of shock protection. Without the safety device, a GFI circuit can protect against a hot wire contact to the frame with the equipment ground open. However, such an individual GFI circuit can fail to provide adequate protection in a scenario in which the safety wire was open and the hot lead touches the metal frame. In this situation, the individual GFI will not trip open as there is no return path for the current. If a person touches the machine under these conditions and completes the circuit to the earth ground, the GFI should trip within one half of a cycle. In contrast, the safety device 100 can recognize this situation and open switch 118 and switch 120, thereby removing power from the vending machine entirely without needing a conductive path through the person.

The safety device 100 can further comprise a surge suppression device (not illustrated) that benefits the operation of the GFI 108. Some GFI's are prone to tripping on conditions unrelated to local ground faults. When an electrical transient occurs on a power distribution network, power spikes can propagate to the safety device 100 and cause the GFI 108 to trip. For example, a ground fault at a remote location on the power grid can send a voltage spike on a hot line that can travel to the safety device's GFI. The GFI 108 can misinterpret this spike as a ground fault. A surge suppressor, either integral to the safety device 100 or externally connected to the power utility in the vicinity of the safety device 100, can suppress such voltage or current spikes or transients. The surge suppressor can operate by shunting the spike to ground, for example. A silicon avalanche photodiode (SAD) is one exemplary type of surge suppressor. Metal oxide varistors are another exemplary form of surge suppressor that can be used with the safety device 100.

The safety device 100 has protection against faulty wiring in the electric outlet, against an open equipment ground between the receptacle and the main circuit breaker panel, and against a high leakage path to the frame within the vending machine. Further, the safety device 100 can be installed without modifying the electrical receptacle or the vending machine. In one exemplary embodiment, vending machines can be retrofitted with safety devices 100, for example external to the vending machine frame or case. As discussed above, the safety device 100 can be used with a variety of household devices as a plug-in safety box.

Components of the safety device will now be discussed. In an exemplary embodiment, the safety device 100 comprises a supply cable with a nominal plug 108, a container box 110, and internal parts. When used with vending machines, an external flashing light and audible alarm 120 can be wired into the circuit but be mounted directly on the vending machine. That is, the safety device 100 can comprise a tether, extension, or umbilical cord that leads to an alarm 120 that can be situated on a vending machine or another prominent location.

The power cable can have a standard 3-prong male plug. The larger flat prong connects to the neutral conductor 104. The smaller flat prong connects to the hot conductor 106. The rounded longer prong connects to the equipment ground conductor 102. The cable can comprise three stranded wires or leads, individually insulated, encased in an insulating cover and capable of carrying the current load of the machine. The cable can be sized for compatibility with a circuit breaker, for example a 20-amp breaker.

The cable enters one end of the safety box 110 and is secured to the box's frame with a clamp (not shown). The individual leads connect to the appropriate points on a control board (not shown) that holds the safety device's various electrical components. The hot lead 106 connects to terminal H1 134. The neutral lead connects to terminal N1 136. The equipment ground lead connects to terminal G1 138. The control board circuits connect to these points 134, 136, 138.

The voltage detection circuit 116 between H1 134 and N1 136 resides on the control board. The detection circuit 116 can comprise a simple 120/12 volts alternating current (VAC) transformer, with a bridge rectifier to convert the low AC voltage to a direct current (DC) voltage. The DC voltage energizes K–1 relay 116 and closes switch S-1 118, 120 when sensing voltages indicative of correct wiring. FIG. 2A illustrates an exemplary circuit diagram or schematic of the circuitry associated with the voltage detector 1.

The control board further carries the voltage detection circuit 114 between H1 134 and G1 138. The detection circuit 114 can comprise a simple 120/12 VAC transformer, with a bridge rectifier to convert the low AC voltage to DC voltage. The DC voltage energizes K–2 relay 114 and closes switch S-2 when sensing voltages indicative of correct wiring. FIG. 2B illustrates an exemplary circuit diagram or schematic of the circuitry associated with the voltage detector 2.

The voltage measuring circuit 130 determines the magnitude of the AC voltage between H1 134 and N1 136. The detection circuit 130 measures the rectified DC voltage on the voltage detector 1. This DC voltage is proportional to and thus indicative of the AC voltage between H1 134 and N1 136. This voltage detection circuit 130 can comprise software or other digital control logic that avoids causing switch 118 and switch 120 to open for momentary low voltage due to initial start up. This capability can also provide automatic restarts when the voltage returns to normal.

The GFI 108 also typically mounts on the control board. The lead from the switch S-4-1 118 connects to the hot contact on the supply side of the GFI 108. The lead from the switch S-4-2 120 connects to the neutral contact on the supply side of the GFI 108. Switch S-5 122, 124 is located in the GFI unit between the hot supply contact and the hot load contact. The GFI switches 122, 124 are normally closed contacts.

The hot lead from the load side of the GFI 108 connects to the H2 terminal 140 on the control board. The neutral lead from the load side of the GFI 108 connects to the N2 terminal 142 on the control board. A lead runs from the ground contact on the GFI 180 to the N1 terminal 136 on the control board. A continuous lead runs from the G1 terminal 138 to the G2 terminal 146 on the control board, without interruption.

An electric cable 112 carries power from the safety device to the vending machine. This cable 112 is brought into the safety device box 110 and is clamped at the entry port. The leads in this cable 112 are hardwired onto the control board. The hot lead 106 for the vending machine cable connects to the H2 terminal 140 on the control board. The neutral lead in this cable 112 connects to N2 terminal 142 on the control board. The ground lead in this cable connects to G2 terminal 146 on the control board.

As discussed above, the strobe and the alarm 120 are mounted on the vending machine where they can be seen and heard. The alarm leads, from the strobe and the wailing siren, connected to circuitry on the control board as illustrated in FIGS. 1 and 2A. Also as discussed above, the box or housing 110 of the safety device 100 can be mounted to the frame of the vending machine.

The construction on the safety device can be straightforward. The power cable to the wall receptacle enters the box or housing 110 via a port or hole on one end and is secured with a clamp. A control board containing the electronic components is mounted inside the box. The power cable leads 106, 104, 102 are separated and connected to terminals H1 134, N1 136, and G1 138, as discussed above.

The control board is sized to hold the components selected, plus the terminal lugs for the leads. The components are mounted on the control board and wired according to the schematics. The control board is mounted in the safety box 110.

A power cable 112 from the vending machine equipment enters the box 110 from the end of the safety box opposite the power supply end and is secured to the box 110 via a cable clamp or other restraining device. The leads of the vending machine cable 112 are separated and connected to terminals H2 140, N2 142, and G2 146 on the control board.

The safety box 110 is sized to hold the control board and to allow for cable termination. The safety box 110 should be made from a non-conducting plastic material if it is to be used as part of an extension cord.

Although a system in accordance with the present invention can comprise a circuit that provides electrical safety protection to a vending machine or other appliance, those skilled in the art will appreciate that the present invention is not limited to a specific application and that the embodiments described herein are illustrative and not restrictive. Furthermore, it should be understood that various other alternatives to the embodiments of the invention described herein may be employed in practicing the invention. The scope of the invention is intended to be limited only by the claims below.

What is claimed is:

1. A system that controls electrical power provided to an appliance via a power conductor, a neutral conductor, and a ground conductor, comprising:
    a first detector that detects a first voltage between the power conductor and the ground conductor,
    a second detector that detects a second voltage between the power conductor and the neutral conductor;
    a first switch in series with the power conductor,
    a second switch in series with the neutral conductor, and
    a coil that automatically closes the first switch and the second switch if the first detector detects the first voltage and the second detector detects the second voltage.

2. The system according to claim 1, wherein the coil automatically closes the first switch and the second switch if the first detector detects that the first voltage is above a first threshold and the second detector detects that the second voltage is above a second threshold.

3. The system according to claim 2, wherein the first switch and the second switch are open if the first voltage is below the first threshold and the second voltage is below the second threshold.

4. The system according to claim 1, wherein the first switch and the second switch are normally open.

5. The system according to claim 1, wherein the system is operative to provide electrical safety protection.

6. The system according to claim 5, wherein the system blocks the electrical power from the appliance if the neutral conductor carries a voltage that is above a threshold.

7. The system according to claim 1, further comprising a ground fault interrupter connected to the ground conductor, the power conductor between the first switch and the appliance, and the neutral conductor between the second switch and the appliance.

8. The system according to claim 7, wherein the ground fault interrupter opens a third switch, in series with the power conductor, and a fourth switch, in series with the neutral conductor, if an electrical fault occurs at the appliance.

9. The system according to claim 1, wherein the appliance is a vending machine.

10. The system according to claim 9, further comprising a housing that encloses the first detector, the second detector, the first switch, the second switch, and the coil.

11. The system according to claim 10, wherein the housing is mounted to the vending machine.

12. The system according to claim 10, wherein the housing mounts to a wall outlet that supplies the electrical power to the vending machine via a power cable.

13. The system according to claim 1, wherein the electrical power comprises single phase power.

14. The system according to claim 1, further comprising an indicator that provides a state indication for the first switch and the second switch.

15. The system according to claim 1, wherein a relay comprises the first detector and the coil.

16. The system according to claim 15, wherein a second relay comprises the second detector.

17. The system according to claim 16, wherein the second relay comprises a switch in series with the coil.

18. The system according to claim 1, further comprising a device that outputs an audible warning if the first detected voltage or the second detected voltage indicates a safety issue with the electrical power.

19. The system according to claim 1, further comprising an alarm that outputs an audible warning if the first detected voltage or the second detected voltage indicates a safety issue with the electrical power.

20. A system that controls electrical power provided to an appliance via a power conductor, a neutral conductor, and a ground conductor, comprising:
   a first detector that continuously monitors a first voltage between the power conductor and the ground conductor;
   a second detector that continuously monitors a second voltage between the power conductor and the neutral conductor;
   a first switch in series with the power conductor, wherein the first switch is normally in an open position;
   a second switch in series with the neutral conductor, wherein the second switch is normally in an open position; and
   a coil that automatically continuously closes the first switch in response to a determination that the first voltage monitored by the first detector is above a first threshold and that automatically closes the second switch in response to a determination that the second voltage monitored by the second detector is above a second threshold, the coil also automatically releasing the first switch in response to a determination that the first voltage monitored by the first detector is not above the first threshold and automatically releasing the second switch in response to a determination that the second voltage monitored by the second detector is not above the second threshold.

21. The system according to claim 20, further comprising a ground fault interrupter connected to the ground conductor, the power conductor between the first switch and the appliance, and the neutral conductor between the second switch and the appliance.

22. The system according to claim 21, wherein the ground fault interrupter opens a third switch, in series with the power conductor, and a fourth switch, in series with the neutral conductor, if an electrical fault occurs at the appliance.

23. The system according to claim 20, wherein the appliance comprises a vending machine.

24. The system according to claim 20, further comprising a housing that encloses the first detector, the second detector, the first switch, the second switch, and the coil.

25. The system according to claim 24, wherein the housing is mounted to the vending machine.

26. The system according to claim 20, further comprising an indicator that provides a state indication for the first switch and the second switch.

* * * * *